United States Patent [19]
Simon

[11] 3,866,737
[45] Feb. 18, 1975

[54] METHOD AND APPARATUS FOR THE CONTINUOUS TRANSFER OF LONGITUDINALLY EXTENDING WORKPIECES

[75] Inventor: Stefan Simon, Moedling, Niederosterreich, Austria

[73] Assignee: Dr. Carl Hahn GmbH, Dusseldorf, Germany

[22] Filed: Jan. 10, 1972

[21] Appl. No.: 216,624

[30] Foreign Application Priority Data
Jan. 15, 1971 Germany............................ 2101932

[52] U.S. Cl............... 198/22 R, 198/20 R, 198/131
[51] Int. Cl............................................. B65g 47/00
[58] Field of Search.......... 198/22 R, 210, 179, 131, 198/24, 144, 20 R

[56] References Cited
UNITED STATES PATENTS

| | | | |
|---|---|---|---|
| 2,571,531 | 10/1951 | Bridge................................ | 198/144 |
| 2,823,789 | 2/1958 | Henning............................. | 198/131 |
| 3,039,587 | 6/1962 | Pollmann........................... | 198/22 R |
| 3,128,881 | 4/1964 | Kuhnle................................ | 198/179 |
| 3,601,242 | 8/1971 | Reinemuth et al................. | 198/22 R |
| 3,631,965 | 1/1972 | Koshkin et al...................... | 198/131 |

*Primary Examiner*—James B. Marbert
*Assistant Examiner*—Joseph E. Valenza
*Attorney, Agent, or Firm*—Jason Lipow

[57] ABSTRACT

A method for the continuous transfer of longitudinally extending workpieces of like dimension to a high speed receiving means which comprises axially transferring serially disposed workpieces at a definite graduation transversely to the direction of transport, clamping the workpieces, feeding the workpieces to a transfer station, and thereafter transferring said workpieces in a direction transverse to their longitudinal axis into a receiving means; an apparatus for said method utilizing, in a preferred embodiment, chain-like transport and transfer elements and specially designed workpiece carrying means adapted to grasp the workpiece and to deposit the workpiece into a recess on a receiving means, suitably a blister drum.

12 Claims, 8 Drawing Figures

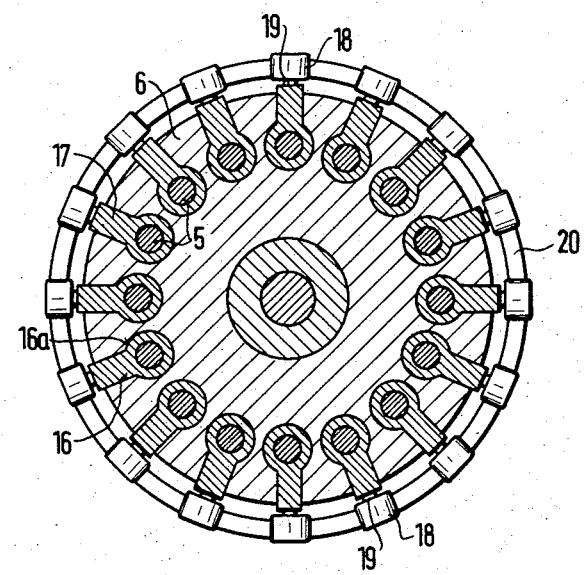
Fig. 3
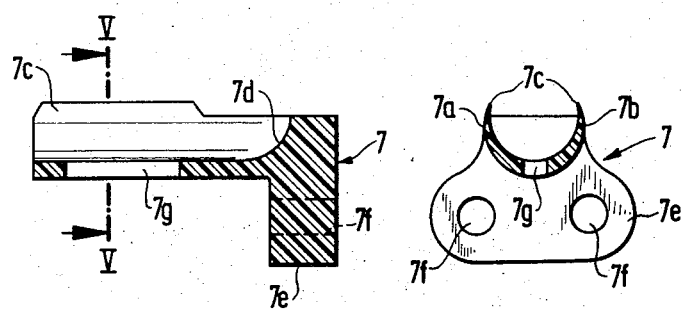
Fig. 4
Fig. 5

Fig. 6
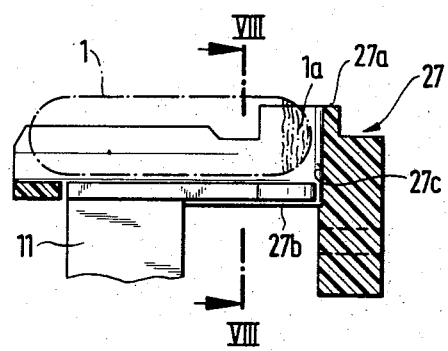
Fig. 8
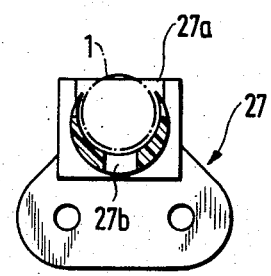
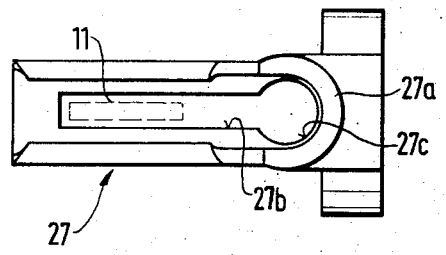
Fig. 7

METHOD AND APPARATUS FOR THE CONTINUOUS TRANSFER OF LONGITUDINALLY EXTENDING WORKPIECES

BACKGROUND OF THE INVENTION

1. Field of the Invention

The invention relates to a method of and an apparatus for the continuous transfer of longitudinally extending workpieces of like dimensions, particularly tampons for feminine hygiene, to a high-speed receiver device, preferably to the pre-formed cups in a foil on a blister drum.

2. Disscusion of the Prior Art and Problems

Since workpieces such as, for example, tampons, may be highly sensitive products, the surface of which can tend to become damaged, for example fluff-up, when frequently touched, and the consistency of which is modified by mechanical loading, both of which can result in the product becoming unusable, this transfer must take place by the shortest route, particularly since, for example compressed absorbent cotton articles which have no form-closing wrapper tend to expand and then, by reason of their increased volume, no longer match the volume of the pre-determined packing.

SUMMARY OF THE INVENTION

Broadly, this invention contemplates a method for the continuous transfer of longitudinally extending workpieces of like dimension to a high speed receiving means which comprises axially transferring serially disposed workpieces at a definite graduation transversely to the direction of transport, clamping the workpieces, feeding the workpieces to a transfer station, and thereafter transferring said workpieces in a direction transverse to their longitudinal axis into a receiving means.

In a particularly desirable embodiment, this invention contemplates an apparatus for performing the method above described, which apparatus comprises a drivable shaft carrying a first transfer drum disposed thereabout, said transfer drum provided with at least one transfer mandrel, said transfer mandrel being displaceable concentrically and longitudinally parallel to the drum axis, an endless flexible transport element on which is mounted a receiver means for workpieces and adjacent thereto an endless flexible transfer element having mounted thereon workpiece carrying means, said workpiece carrying means adapted to be carried on said second endless flexible transfer element in accurate graduation in respect of the transfer mandrel whereby, the area of coincidence of the transport element with the transfer element, parallel to said shaft, the workpiece carriers and the receiver means are flush with the transfer mandrel, by means of which the workpieces can be transferred axially out of the receiver means and into the workpiece carriers.

DESCRIPTION OF THE INVENTION

The invention resolves the problem set forth above in that the workpieces disposed at a certain graduation one after another and transversely to the direction of transport are moved axially into a transfer device, are clamped therein and are fed by this to a trnsfer station and are then fed into the depressions in the receiver device, transversely to their longitudinal axis.

An arrangement for carrying out the method according to the invention must allow for the fact that the workpieces are carried transversely to the direction of movement in a fixed spacing dependent upon the workpiece carriers, after which they are transferred radially into a continuously moving strip packing, i.e., into a foil with pre-shaped cups or into a so-called blister packing in a spacing dependent upon the format of the workpiece or tampon which may vary in its dimensions. For this purpose, the apparatus requires an intermediate feed-in device which at the same time has equality of graduation in the area in which the workpiece is accepted and at least transient equality of graduation with the depressions in the receiver device with at least two or more different graduations. At the same time, the introudction of a plurality of intermediate stages with correspondingly complicated operating elements ought to be avoided.

The apparatus according to the invention for carrying out the method resolves the problem outlined above in that about a shaft alongside a transfer drum mounted on this shaft and having transfer mandrels adapted for displacement concentrically therein and longitudinally parallel with the drum axis, there is an endless flexible conveyor element with, secured thereon, receiving elements for the workpieces and alongside it an endless flexible transfer element with, mounted thereon, workpiece carriers which are in exactly the same spacing as the transfer mandrels, whereby, in the area of overlap of the transfer element and the transport element, parallel with the shaft, the workpiece carriers and receiver elements are flush with the transfer mandrels by means of which the workpieces can be transferred axially out of the receiver elements into the workpiece carriers.

In order to transfer the workpieces radially into the depressions in the receiver device, it is possible to mount on a reversing shaft for the endless flexible transfer element a transfer drum in which transfer push-rods are mounted in the same angular intervals, being adjustable radially outwardly through slots in the workpiece carriers so that the workpieces can be ejected one after another in depressions provided on the periphery of a receiving drum.

The transfer drum can be so constructed that in undercut guide grooves which are distributed at the same angular distances over the periphery of the transfer drum concentrically with and parallel with the drum axis, there are pushers, the outer sides of which carry at each end a wheel, each wheel following a drum cam, whereby from an end face of each pusher a transfer mandrel projects parallel with the guide groove over a length which corresponds at least to the width of the transport element and the length of a receiver element. Both drum cams which are disposed in a spaced relationship around the transfer durm may be of two-part construction and may be applied clearance-free on the pusher wheels.

The transport element is expediently so onstructed that the sleeve-like receiver elements form extensions of hollow hinge-pins of the chain-like transport element and extend from the chain in the direction of the workpiece carriers. In this way, an exact spacing of the workpieces on the one hand and a positive guiding thereof on the other can be assured.

A particularly advantageous development of the workpiece carriers can be achieved by the inside cross-section of the trough-shaped workpiece carriers being smaller than the cross-section of the workpieces, the elastic long sides of the workpiece carriers forming clamping jaws which enclose around the workpiece as far as a location above the longitudinal axis through its centre. In this way, an exact guiding of the workpieces is assured also by virture of the workpiece carriers the workpiece carriers themselves being extremely simple in their structural design and inexpensive to manufacture.

For reliable transfer of the workpieces from the workpiece carriers into the receiver durm, a further contributory factor is that the workpiece carriers are closed at least at their end which is remote from the transfer drum up to approximately at least the height of their clamping jaws and have a bearing surface adapted to the shape of the end face of the workpieces.

A reliable transfer particularly of tampons with loosely-applied tapes is facilitated by the further measure that the workpiece carriers, at least at their closed end, are adapted laterally and at their end face to the full height of the workpieces so that the closed end of the workpiece carriers, in the transfer position thereof, form a closed transfer passage with the depression in the receiving drum.

The slots are expediently provided in the middle of the width of the trough-shaped bottoms of the workpiece carriers and extend at least over the middle longitudinal area of the long sides which act as clamping jaws. Thus, the workpieces can be gripped by the transfer push-rods over the middle of their length and ejected into the receiver drum.

According to another embodiment of the workpiece carriers, the slots can extend as far as the closed end of the workpiece carriers, where they are widened out to approximately the largest diameter of the workpiece. This measure is particularly recommended for tampons, wherein the withdrawal tape is applied spirally or in some other manner to the withdrawal end of the tampon.

In order to guarantee a simple but reliable attachment of the workpiece carriers to the transfer member. it is advisable for the closed end of the workpiece carriers to be angled into the plane of rotation of the transfer element, the angled-off part being constructed to correspond to the tongue of an element of the chain-like transfer member carrying the trough-shaped part of the workpiece carrier between the two hinge points of the angled part.

So that the receiving elements and the workpiece carriers are accurately guided in the transfer zone and so that an accurate transfer of the workpieces from the receiving elements into the workpiece carriers in the axial direction of the workpieces is possible, it is recommended that both the receiving elements and also the workpiece carriers to be supported in transverse grooves in supporting wheels which are located beside one another on the drivable shaft between the pinions for the chain-like transport element and the chain-like transfer element.

A simple and reliable functioning of the transfer drum can be achieved in that, in the interior of the transfer drum, supporting thrust springs have their other end applied in each case under initial tension directed outwardly and radially to the axis of the transfer drum, to a transfer push-rod braced by means of a wheel on a rotatable control cam.

By way of example, an apparatus for carrying out the method according to the invention is illustrated in the attached drawings, in which:

FIG. 3 shows a section along the line III—III in FIG. 2;

FIG. 4 is a longitudinal section through a workpiece carrier;

FIG. 5 is a section taken along the line V—V in FIG. 4;

FIG. 6 is a longitudinal section through another embodimeent of a workpiece carrier with a tampon located therein and with a transfer push-rod located inside the slot of the workpiece carrier;

FIG. 7 is a plan view of FIG. 6 and

FIG. 8 is a side elevation of the workpiece carrier according to FIGS. 6 and 7,

Figure 1:
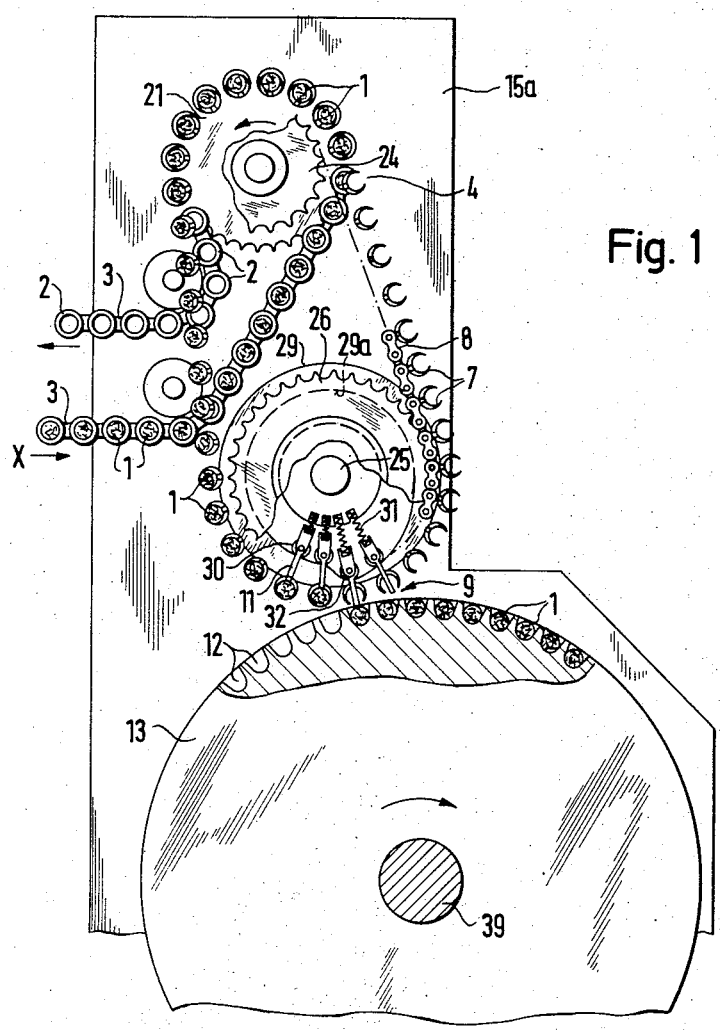
FIG. 1 is an elevation of the apparatus.

FIGS. 1, 2, 6 and 8 show tampons 1, to the withdrawal end of which a withdrawal tape 1a is preferably spirally applied. These tampons are fed continously in the direction of the arrow $x$ in FIG. 1 by means of receiving sleeves 2 of a chain-like transport element 3 directed transversely to the direction of transport $x$ to a transfer zone 4 in which the tampons are successively passed axially through transfer mandrels 5 on a transfer drum 6 penetrating into receiver sleeves, into workpiece carriers 7 on an endless flexible transfer member 8, in which the tampons are clamped fast. The tampons are thereby fed to a transfer station 9 in which the tampons are ejected out of the workpiece carriers by means of transfer push-rods 11 which are radially adjustable in a transfer drum 10, into cups 12 (FIG. 1) in a high-speed rotating blister drum 13.

Figure 2:
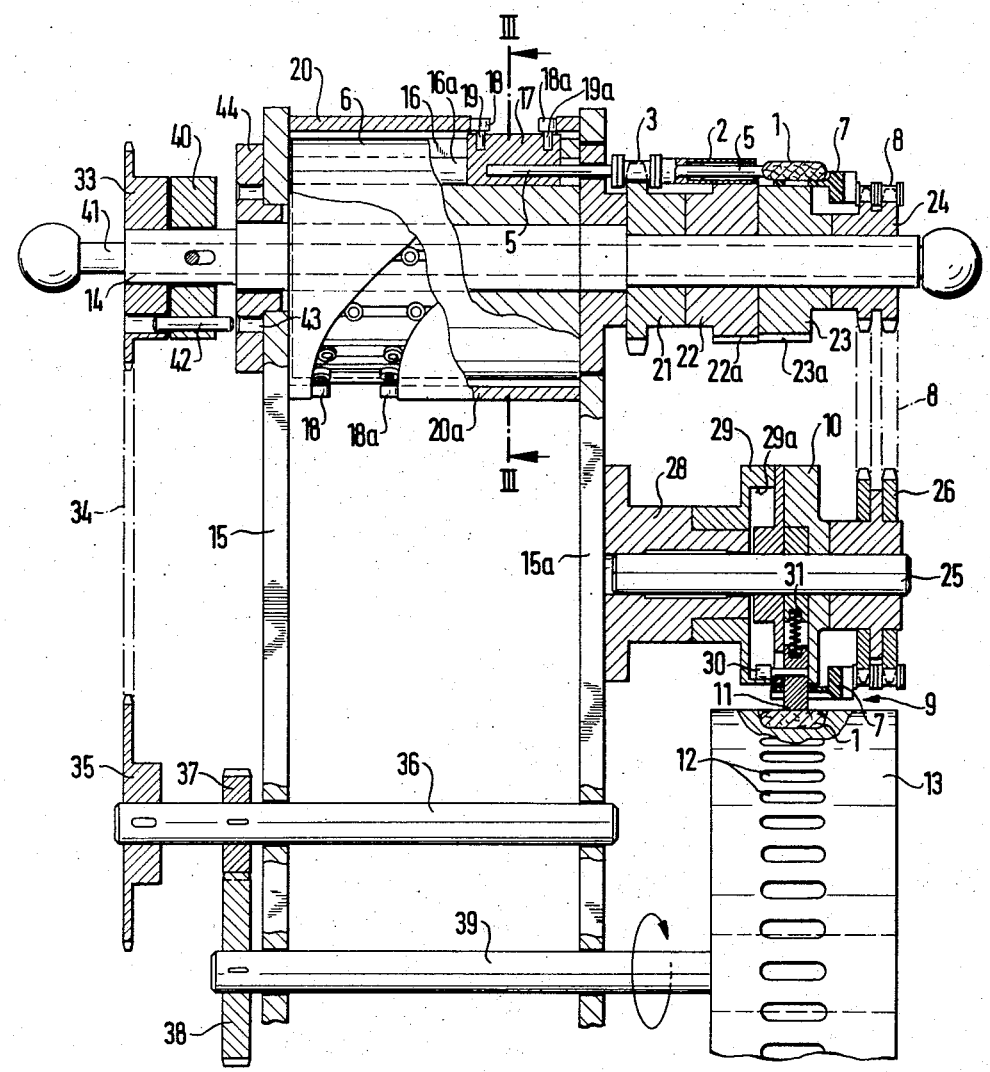
FIG. 2 is a side elevation of FIG. 1, partly in axial section, to illustrate the axial transfer of the workpieces from transprot element into the workpiece carriers and the radial transfer of the workpieces out of the workpiece carriers into a blister drum.

In detail, FIGS. 1 and 2 show a hollow drivable shaft 14 which is mounted to rotate in two side walls 15, 15a in a machine frame. Between the two side walls, the transfer drum 6 is mounted on the shaft.

The transfer drum, as shown in greater detail in FIG. 3, is provided with back-cut longitudinal grooves 16, of which the back-cut portion 16a is of arcuate cross-section. In these back-cut grooves which are distributed concentrically at the same angular spacings over the cylindrical periphery of the transfer drum, pushers 17 are mounted for reciprocating movement, their outer surfaces projecting slightly beyond the periphery of the drum. At the ends of their outer sides, the pushers carry wheels 18, 18a which are mounted to rotate on radially outwardly projecting spindles 19, 19a. The wheels 18, 18a in each case follow a drum cam 20, 20a which engage at a small radial distance around the transfer drum 6 and which are so secured on the walls 15, 15a that they can be applied without clearance against the wheels 18, 18a of the pushers 17. This measure makes it possible to acheive quite considerable strokes on a relatively small diameter which is determined by the graduation of the transport member 3.

From the end face of the pushers 17 which is towards the transport member 3 project the transfer mandrels 5 which extend axially to the back-cut part 16a of the longitudinal grooves 16 and which have a diameter which is smaller than the inside cross-section of the receiving sleeves 2. The length of the part of the transfer mandrels which at any time is projecting from the pusher is so selected that, as FIG. 2 shows, in the extreme position of transfer movement of the mandrels, their front end always projects out of that end of the receiving sleeve which is directed away from the drum.

The receiving sleeves form the continuation of the hollow hinge-pins of the transport member, so that the graduation thereof corresponds to the graduation of the workpieces in the receiving sleeves. The transport member can be driven through a driving pinion 21 which is mounted on the shaft 14 and which is mounted in front of the outside face of the wall 15a of the transfer drum 6. On the side remote from the transfer drum there is on the shaft 14 a supporting wheel 22 which has transverse grooves 22a which serve to brace the receiving sleeves 2 when they are reversed around the shaft 14. The supporting wheel 22 has adjacent to it a further supporting wheel 23 for the workpiece carriers 7, of which the troughshaped underside is located in transverse grooves 23a when reversed around the shaft 14. Adjacent to this on the shaft 14 is a double gear pinion 24 over which the transfer chain 8 is guided, which at the same time, through a double pinion 25, drives the transfer drum 10.

The trough-shaped workpiece carrier 7 shown in FIGS. 4 and 5 has an inside cross-section which is smaller than the cross-section of a tampon 1. The long sides 7a, 7b of the trough-shaped workpiece carrier are elastic and form clamping jaws whcih, as FIG. 5 clearly shows, enclose the tampon 1 to a point above its central longitudinal axis. Towards the open end, the long sides 7a, 7b are formed at the top, at 7c, in a knife edge configuration, so that the cross-section of the long sides towards the trough bottom of the workpiece carrier is increasingly larger in dimenson.

The end of the trough which is opposite to the open end is closed and forms for the tampon a bearing surface 7d which is adapted to the withdrawal end thereof. The closed end of the workpiece carrier 7 is angled in the plane of rotation of the transfer member 8, the angled part 7e being constructed to correspond to the side plate of a link of the transfer chain and carrying the trough-shaped part of the workpiece carrier betwen the two points of articulation 7f of the angled part.

In the midddle of the width of the trough-shaped bottom of the workpeice carrier, there is a slot 7g whcih extends at least over the middle of the length of the knife-edged part 7c of the long sides.

FIGS. 6 to 8 show a different workpiece carrier 27 which differs substantially from the embodiment shown in FIGS. 4 and 5 in that its closed end 27a is laterally and at the end more or less adapted to the complete height of a tampon, the height of the closed end being so dimensioned that in the transfer position 9, it forms a virtually closed transfer passage with the cup 12 in the blister drum 13. Naturally, it is also possible to form over the entire length of the tampon a closed transfer passage by the long sides of the carrier trough being extended appropriately high to approximately the height of the cross-section of the tampon, the tampon being reliably held by the elastic construction of the long sides and by bead-like projections on the inside of the long sides. FIG. 7 shows that a longitudinal slot 27b in the longitudinal centre of the bottom extends as far as the closed end of the trough, where it widents out to approximately the largest diameter of the tampon at 27c. This embodiment of the slot makes it possible by appropriately constructiing the cross-section of the transfer push-rod, to enclose a tampon with a loosely-attached withdrawal tape, at least in the region of the tape, and so ensure a reliable transfer not only of the tampon but also of the withdrawal tape which is bearing on its withdrawal end. The other parts of the workpiece carrier according to FIGS. 6 to 8, correspond substantially to the embodiments shown in FIGS. 4 and 5.

Mounted on the frame wall 15a is a bearing 28 for the spindle 25 on which is mounted a control cam 29 with an interanal control surfaces 29a which, in order to adjust to the most favourable transfer zone for the radial ejection movement of the tampon into the cups 12 on the blister drum, is adjustable in its position of rotation. The control surface 29a is scanned by wheels 30, the axes of which are parallel with the axis or spindle 25 on one of the transfer push-rods 11. The transfer push-rods are disposed for radial displacement in the transfer drum 10 and each is subject to the action of a thrust spring 31, the one end of which is braced inside the drum while the other end is braced on the inside of the transfer push-rod. In consequence, the wheels 30 are subject to elastic initial tension, bearing always on the control surface 29a of the cam 29. The cam itself, as shown in FIG. 1, is so constructed that in the region of the transfer station 9, it is recessed sharply radially outwardly at 32, so that the transfer push-rod 11 which commences the ejection process one graduation previously under the thrust of the spring, within one graduation angle, is extended radially out of the transfer drum through the slot in the workpiece carrier to above the height of its long sides, so that the tampon in the cup 12 or in a corresponding cup-shaped depression of a strip form foil on the blister drum 13 is ejected. During the further course of rotation of the transfer drum, as the pattern of the cam 29 shows, the transfer push-rods are pushed radially inwardly into the drum again against the thrust of the spring 31.

Mounted on the shaft 14 is a chainwheel 33 for the driving chain 34 which is guided over a furthe chainwheel 35 on a drive shaft 36. The drive shaft 36 carries a smaller gearwheel 37 which meshes with a gearwheel 38 of larger diameter which is mounted on a shaft 39 which at the same time carries the blisters drum 13. The equality of graduation in the region of the axial transfer of the tampons from the receiving elements into the workpiece carriers is achieved by conformity of the transport element driving pinion 21 with the transfer chain driving pinion 24, the difference in the diameters of these two wheels being the dimensions for the radial projection of the workpiece carriers 7 beyond the transfer chain 8.

In the region of the radial transfer of the tampons into the cups in the blister durm, the necessary equality of graduation is achieved in the same manner as in the region of axial transfer, the projection of the workpiece carriers however hence the diameter of the chain pinion 26 being pre-determined so that here too the angle of deflection of the workpiece carriers bearing on the pitch circle provide a graduation which is adequate for the blister drum.

For idling, the apparatus may be uncoupled from the chain system by displacement of a coupling 40 by means of a shift-rod into a bore 43 of a flange 44 on the wall 75 and secured against rotation.

Thus, it is obvious that for the transfer of axially movable tampons into a continuously moving packing machine, the transfer element, as the only intermediate element with the specially constructed workpiece carriers, in conjunction with the transfer drum and the transfer push-rods correspondingly controlled with the workiece carriers is adequate.

The tampons may be manufactured according to the U.S. Pat. Nos. 2,763,899 and 2,798,260 and may be axially transferred into the receiving sleeves 2 of the chain-like transport element 3. The bilister drum is a part of the blister machine, which therefor has not been shown in the drawings.

What is claimed is:

1. An apparatus for the continuous transfer of longitudinally extending tampons of compressed absorbent fiber material of like dimension to a high-speed receiver means, which apparatus comprises a driveable shaft carrying a first transfer drum disposed theeabout, said transfer durm provided with at least one transfer mandrel, means for displacing said transfer mandrel concentrically and longitudinally parallel to the drum axis, a chain-like element provided with sleeve-like tampon receiver means, said receiver means forming extensions of hollow hinge pins, said sleeve-like receiver means extending from the chain in the direction of a workpiece carrying means, an endless transfer element having mounted thereon workpiece carrying means having a slot therein, each of which workpiece carrying means is in the form of a trough-like member having an inside cross section smaller than the cross section of the tampon to be carried and elastic long sides forming clamping jaws which can enclose around the tampon to a point above a longitudinal axis through its center, said workpiece carrying means at least at its end remote from and facing said first transfer drum being closed to substantially the full height of the tampon to be carried so that the closed end of the workpiece carrying means facing said first transfer drum, in the transfer position thereof, forms a substantially closed transfer passage with said receiver means, a second transfer drum carrying said endless transfer element, said chain-like element and said endless transfer element trained with respect to one another, said transfer mandrel and said means for displacing said transfer mandrel such that in the area of end-to-end alignment of said receiver means with said workpiece carrying means said means for displacing said transfer mandrel moves said transfer mandrel concentrically and longitudinally parallel to said drum axis whereby said transfer mandrel transfers a tampon from said receiver means to said workpiece carrying means, said apparatus having a reversing shaft on which said second transfer drum is mounted rigidly said second transfer drum carrying, at least in part, said endless flexible element, said second drum provided with transfer push-rods mounted at identical angular distance and means for displacing said push-rods radially outward through a slot in the workpiece carrying means, a revolvable drum having depressions provided on the periphery thereof, said drum disposed in facing relationship to said second transfer drum whereby tampons can be serially ejected from said workpiece carrying means into said depressions.

2. Apparatus for the continuous transfer of longitudinally extending workpieces of like dimension to a high-speed receiving means, which apparatus comprises a driveable shaft carrying a first transfer drum disposed thereabout, said transfer drum provided with at least one transfer mandrel. means for displacing said transfer mandrel concentrically and longitudinally parallel to the drum axis, an endless flexible transport element on which is mounted a receiver means for workpieces and adjacent thereto an endless transfer element having mounted thereon workpiece carrying means; a second transfer drum carrying said endless transfer element, said endless flexible transport element and said endless transfer element trained with respect to one another, said transfer mandrel and said means for displacing said transfer mandrel, such that in the area of end-to-end alignment of said receiver means with said workpiece carrying means said means for displacing said transfer mandrel moves said transfer mandrel concentrically and longitudinally parallel to said drum axis whereby said transfer mandrel transfers a workpiece from said receiver means to said workpiece carrying means, said transport element being a chainlike element provided with a sleeve-like receiver elements which form extensions of hollow hinge pins, said sleeve-like receiver elements extending from the chain in the direction of the workpiece carrying means, said workpiece carrying means being trough-like and having an inside cross section smaller than the cross section of the workpiece to be carried and having elastic longitudinal sides forming projecting clamping jaws which can enclose a majority of the workpiece about a longitudinal axis through its center, said workpiece carrying means being closed at its end remote from and facing said first transfer drum to at least even with the projecting longitudinal axis, said workpiece carrying means also having a bearing surface having the shape of the end face of the workpiece to be carried.

3. An apparatus according to claim 2 wherein said workpiece carrying means has a slot therein, and said apparatus has a reversing shaft provided with a second transfer drum mounted rigidly thereto, said transfer drum carrying, at least in part, said endless flexible transfer element, said apparatus provided with at least one transfer push-rod mounted at identical angular distance in respect of a slot in said workpiece carrying means and means for displacing said push-rod radially outward through said slot in the workpiece carrying means, said apparatus further comprising a drum receiving means in facing relationship to said second transfer drum, said drum receiving means having depressions on the periphery thereof, whereby workpieces can be serially ejected into said depressions.

4. An apparatus according to claim 2 wherein said apparatus further comprises a drum cam, and undercut guide grooves positioned over the periphery of said transfer drum concentrically and parallel to the drum axis at identical angular distances over said periphery, said apparatus having pushers, the ousides of which carry at each of their two ends a wheel, each of which wheels is responsive to said drum cam, said pushers each provided with a transfer mandrel projecting from the end face of the pusher parallel with the guide groove over a length which corresponds at least to the width of said transport element and the length of said receiver means.

5. An apparatus according to claim 4 wherein two drum cams are located at an interval around said first transfer drum, said drum cams being of two-part construction and positioned without clearance against the wheels positioned on the ends of said pushers.

6. An apparatus according to claim 2 further comprising pinions and supporting wheels provided with transverse grooves, said receiver means and said workpiece carrying means supported on said wheels said supporting wheels located alongside one another between said pinions.

7. An apparatus according to claim 3 wherein said apparatus comprises a wheel and said second transfer drum is provided with thrust springs braced in the interior thereof, said thrust springs at their outer end bearing under outwardly directed initial tension radially directed to the axis of said second transfer drum, each of said thrust springs bearing on a transfer-push rod, each of said push rods braced on a rotatable cam by means of said wheel.

8. An apparatus according to claim 3 wherein said receiver means has a depression therein and the receiver means, the workpiece carrying means and the depression in the receiving means are sized to accomodate a tampon.

9. An apparatus according to claim 2 wherein a receiving means has a depression therein, said workpiece carrying means is at least at its closed end remote from and facing said first transfer drum closed the full thickness of the workpiece to be carried so that the closed end of the workpiece carrying means, in the transfer position thereof, forms a substantially closed transfer passage with said depression.

10. An apparatus according to claim 3 wherein each slot in said workpiece carrier is provided midway across the width of the workpiece carrying means and extends at least over the middle of the length of the long sides which function as clamping jaws.

11. An apparatus according to claim 10 wherein each slot in said workpiece carrying means has a closed end and each slot extends as far as its closed end where it is widened to approximately the largest diameter of the workpiece to be carried.

12. An apparatus for the continuous transfer of longitudinally extending workpieces of like dimension to a high-speed receiving means, which apparatus comprises a driveable shaft carrying a first transfer drum disposed thereabout, said transfer drum provided with at least one transfer mandrel, means for displacing said transfer mandrel concentrically and longitudinally parallel to the drum axis, an endless flexible transport element on which is mounted a receiver means for workpieces and adjacent thereto an endless transfer element having mounted thereon workpiece carrying means each of which has a closed end, workpiece carrying means carried on said endless transfer a second transfer drum carrying said endless transfer element, said endless flexible transport element and said endless transfer element trained with respect to one another, said transfer mandrel and said means for displacing said transfer mandrel such that in the are of end-to-end alignment of said receiver means with said wokpiece carrier means said means for displacing said transfer mandrel moves said transfer mandrel concentrically and longitudinally parallel to said drum axis whereby said transfer mandrel transfers a workpiece from said receiver means to said workpiece carrying means, the closed end of the workpiece carrying means being angled in the plane of rotation of the transfer element, said transfer element being chain-like, the angled part of the workpiece carrying means being constructed to correspond to the side plate of a link of the chain-like transfer element and carrying at trough-shaped part of the workpiece carrying means between two points of articulation of the angled part, said transport element being a chain-like element which is provided with sleeve-like receiver means which form extensions of hollow hinge pins, said sleeve-like receiver elements extending from the chain in the direction of the workpiece carying means.

* * * * *

UNITED STATES PATENT OFFICE
CERTIFICATE OF CORRECTION

Patent No. 3,866,737  Dated February 18, 1975

Inventor(s)  Stefan Simon

It is certified that error appears in the above-identified patent and that said Letters Patent are hereby corrected as shown below:

In Column 1, line 53, "whereby, the area" should read --- whereby, in the area ---.

In Column 2, line 56, "durm" should read --- drum ---.

In Column 2, line 59, "onstructed" should read --- constructed ---.

In Column 3, line 56, "carriers to be supported" should read --- carriers be supported ---.

In Column 4, line 7, "from transprot" should read --- from a transport ---.

In Column 5, line 19, "troughshaped" should read --- trough-shaped ---.

In Column 5, line 46, "whcih" should read --- which ---.

In Column 5, line 65, "widents" should read --- widens ---.

In Column 6, line 1, "constructiing" should read --- constructing ---.

In Column 6, line 12, "interanal control surfaces" should read --- internal control surface ---.

In Column 6, line 42, "furthe" should read --- further ---.

In Column 6, line 46, "blisters" should read --- blister ---.

In Column 6, line 56, "durm" should read --- drum ---.

In Column 6, line 66, after "means of a shift rod" and before "into a bore 43", insert " 41 and graduation-correct engagement of a coupling pin 42".

PC-1050
(5/69)

UNITED STATES PATENT OFFICE
CERTIFICATE OF CORRECTION

Patent No. 3,866,737      Dated February 18, 1975

Inventor(s) Stefan Simon

It is certified that error appears in the above-identified patent and that said Letters Patent are hereby corrected as shown below:

In Column 7, Claim 1, line 19, "theeabout" should read --- thereabout ---.

In Column 8, Claim 2, line 3, "mandrel." should read --- mandrel, ---.

In Column 8, Claim 2, line 20, "chainlike" should read ---chain-like ---.

In Column 9, lines 23-24, "receiving means" should read --- receiver means ---.

In Column 10, lines 13-14, delete "workpiece carrying means carried on said endless transfer".

In Column 10, line 19, "in the are" should read --- in the area ---.

Signed and Sealed this seventh Day of October 1975

[SEAL]

Attest:

RUTH C. MASON
*Attesting Officer*

C. MARSHALL DANN
*Commissioner of Patents and Trademarks*